United States Patent [19]

Benckert et al.

[11] Patent Number: 5,470,167
[45] Date of Patent: Nov. 28, 1995

[54] LOCKING DEVICE FOR PULL-OUT SUPPORTS

[75] Inventors: Hartmut Benckert, Filderstadt-Sielmingen; Dieter Schillinger, Neuhausen, both of Germany

[73] Assignee: Putzmeister-Werk Maschinenfabrik GmbH, Aichtal, Germany

[21] Appl. No.: 256,329
[22] PCT Filed: Jan. 21, 1993
[86] PCT No.: PCT/EP93/00131
  § 371 Date: Jul. 7, 1994
  § 102(e) Date: Jul. 7, 1994
[87] PCT Pub. No.: WO93/19957
  PCT Pub. Date: Oct. 14, 1993

[30] Foreign Application Priority Data

Apr. 6, 1992 [DE] Germany ............... 42 11 493.4

[51] Int. Cl.[6] .................. B66C 5/00; E05C 1/12
[52] U.S. Cl. ............. 403/322; 248/409; 280/766.1; 292/169; 292/341.15; 403/321
[58] Field of Search ............... 212/189, 302; 280/763.1, 766.1; 292/169, 169.14, 175, 341.15; 403/321, 322; 248/409, 411, 414

[56] References Cited

U.S. PATENT DOCUMENTS

| | | | |
|---|---|---|---|
| 2,595,453 | 5/1952 | Gilmore | 280/763.1 |
| 4,243,256 | 1/1981 | Frydrych | 292/169 X |
| 4,530,532 | 7/1985 | Fujiya | 292/341.15 |

*Primary Examiner*—Dave W. Arola
*Assistant Examiner*—Andrea Chop
*Attorney, Agent, or Firm*—Kenyon & Kenyon

[57] ABSTRACT

A locking device is provided for a retractable support member for mobile machines and the like. The support member is movable between a retracted transport position and an operating support position. The locking device includes a locking bolt moveable between a locking position, an unlocking position, and a release position with the bolt being biased toward the locking position. An actuating member moveable between first and second end positions is provided for engaging a driving element extending from the locking member such that the locking bolt can be moved from the locking position to the unlocking position when the actuating member is moved from the first end position to the second end position. An engagement and guide member is connected to the support member and includes two locking surfaces engagable with the locking bolt for locking the support member in the transport and operating positions. The engagement and guide member also includes a cam portion between the two locking surfaces that is engagable with the locking bolt for displacing the locking bolt from the unlocking position to the release position wherein the driving element is disengaged from the actuating member and the actuating member consequently moves automatically from its second end position to its first end position. The locking device thereby assures that the, support member is automatically locked when in either the transport or operating position and that the locking device need only be actuated for unlocking the support member.

14 Claims, 2 Drawing Sheets

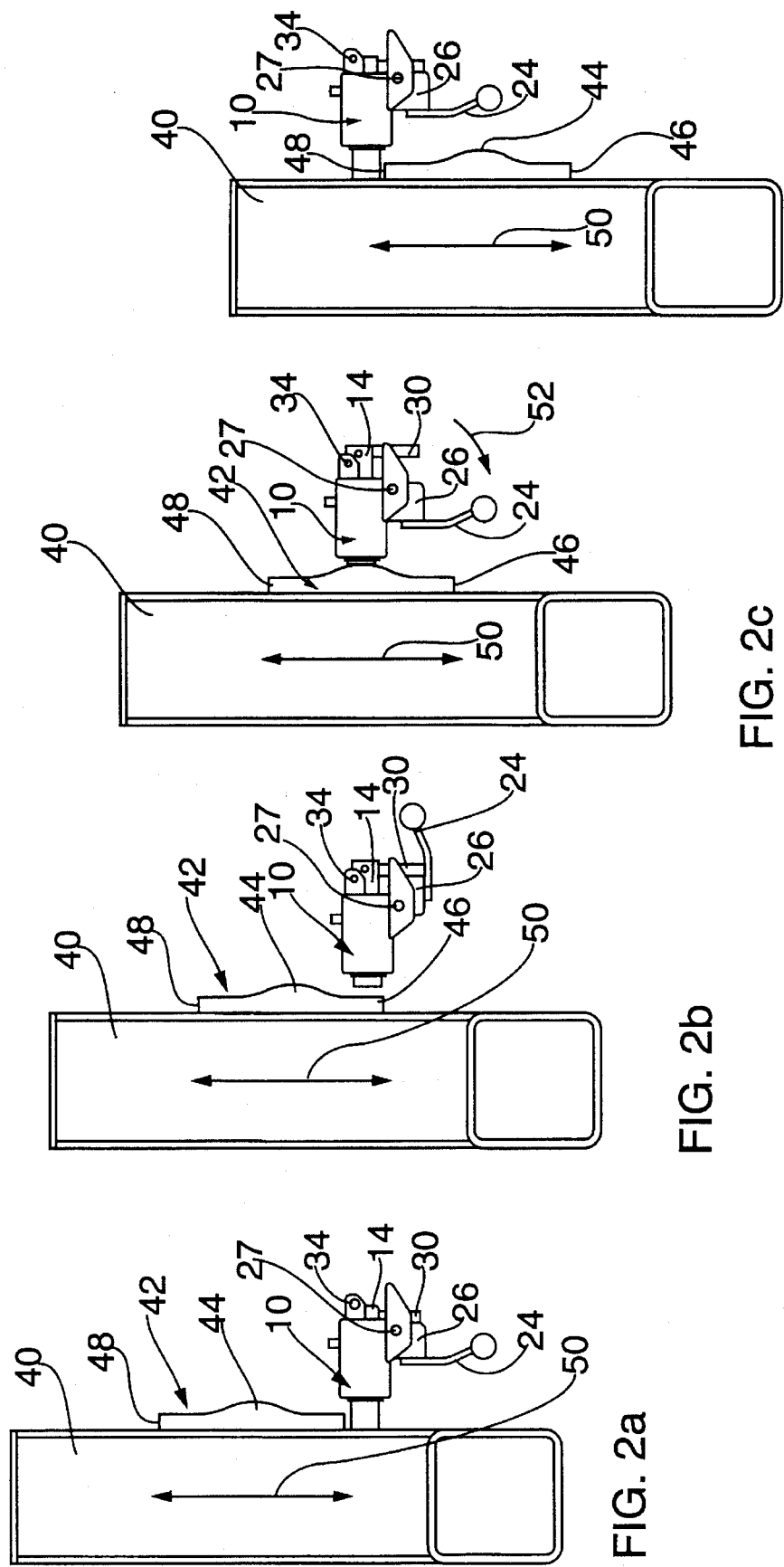

LOCKING DEVICE FOR PULL-OUT SUPPORTS

FIELD OF THE INVENTION

The present invention relates to a locking device for supports that are arranged on an undercarriage or supporting frame and that can be laterally pulled out, swung out or telescoped from a retracted transport position into an extended support position, in particular for supporting legs on mobile machines such as concrete pumps or lift devices.

BACKGROUND OF THE INVENTION

Mobile machines having crane or distribution mast superstructures are supported on the ground in their operating position customarily with supporting legs that can be laterally extended or swung out (EP-A-357 988). It is important in this regard that the supports, which can be extended for instance by hydraulic motors, are effectively and reliably locked by means of the locking device both in their internal transport position and in their supporting position.

OBJECT AND SUMMARY OF THE INVENTION

It is the object of the present invention to provide a locking device of the type mentioned above that assures with simple means that the supports are automatically locked both in their transport position and in their supporting position and which device need only be actuated for unlocking.

To achieve this objective, the following combination of features is proposed according to the invention:

A locking bolt is provided that is slidable in a guide sleeve fixed to the frame transverse to the pull-out direction of the support between a locking position, an unlocking position, and a release position and which is pretensioned in the direction of the locking position under the action of a spring;

An actuating member is provided that is swingable or slidable relative to the sleeve between two end positions, and that rests against a driver arranged on the locking bolt and acts on the former for displacement of the locking bolt between the locking position and the unlocking position;

An engagement and guide member is provided that is rigidly arranged on the pull-out part of the support and that has in each case one locking surface which, in the transport position and in the support position of the support, comes against the locking bolt in its locking position, as well as a lead cam that extends in the region between the two locking surfaces and that acts on the locking bolt and moves the latter between its unlocking position and its release position; The driver can be uncoupled in the release position from the actuating member, which is in its end position corresponding to the unlocking position, it being possible for the uncoupled actuating member to automatically move into its end position which corresponds to the locking position.

In accordance with the invention the locking device need be actuated upon the pulling-out of the supports only for unlocking, while the locking in the two end positions of the supports takes place automatically. Incorrect handling upon the retracting and extending of the supports due to the absence of locking is thereby excluded.

One advantageous embodiment of the invention provides that the actuating member has a link element that can preferably be swung by means of a lever, that the link element has two cam or engagement sections connected to each other by an actuating cam, the driver resting against said cam or engagement sections in the locking position and in the unlocking position of the locking bolt under the action of the spring and with the creation of a form-locked and/or force-locked holding or engagement connection and that the driver can be lifted off from the link element in the release position of the locking bolt while the link element can be swung back automatically into its locking position preferably under the action of gravity. The link element can for this purpose be preferably mounted eccentrically swingable around a horizontal shaft connected with the sleeve relative to its two cam or engagement sections which are preferably aligned vertical to each other while the lever points essentially vertically downward in its locking position and is aligned essentially horizontally in its unlocking position.

Another advantageous embodiment of the invention provides that the locking bolt protrudes on the side of the support beyond the guide sleeve and that the engagement surfaces of the engagement and guide member, which face away from each other, are aligned parallel to the direction of displacement of the locking bolt and come in the locking position laterally against the locking bolt while the lead cam of the engagement and guide member rests against the free end surface of the locking bolt.

The plate-shaped link element is advantageously mounted between two bearing plates connected to the sleeve while the driver is preferably a straight pin-shaped arm, which engages into the region between the bearing plates. The two cam or engagement sections of the link element are advantageously developed as straight edges of the plate-shaped link element, which edges are arranged perpendicular to each other and against which the pin-shaped driver rests over its length.

An additional securing of the locking bolt in its locking position is achieved in the manner that in the rear part of the sleeve, preferably in the region of a rear sleeve arm, there is arranged a transverse bore, which is blocked by the locking bolt in the unlocking and release position and opened in the locking position, for receiving a safety plug which extends over the locking bolt in the rear.

BRIEF DESCRIPTION OF THE DRAWING

The invention will be explained in greater detail below with reference to an embodiment shown diagrammatically in the drawings, wherein:

FIGS. 2a, 2b, 2c, and 2d are top views of a telescoping support leg and a locking device shown in various displacement and actuating positions.

DETAILED DESCRIPTION

Figure 1:
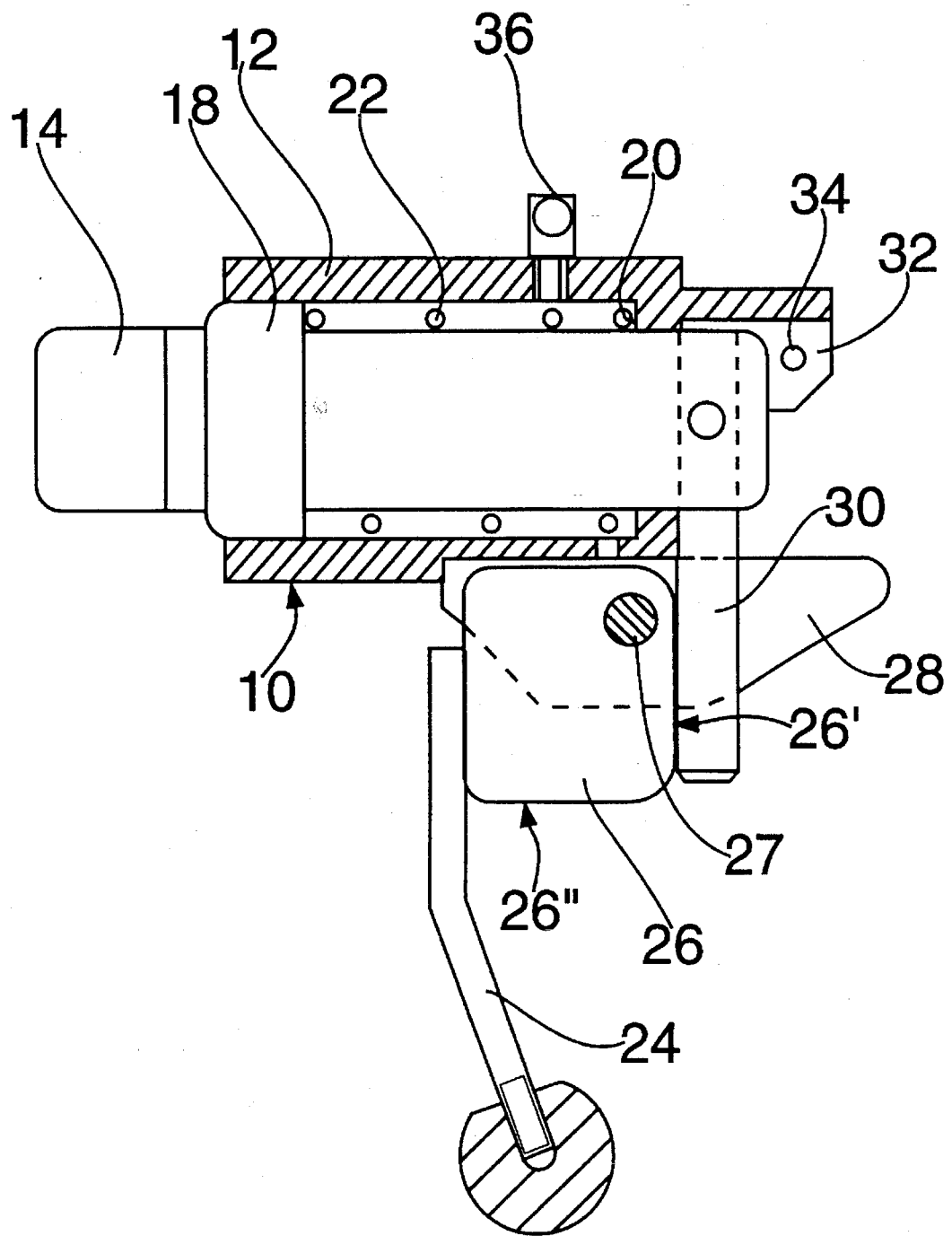
FIG. 1 is a vertical cross-section view of a locking device for telescoping support legs of mobile machines.

The locking device shown in the drawings consists essentially of a locking mechanism 10, which is arranged on a part (not shown) connected with the frame, preferably on a supporting leg housing of a machine, and of an engagement and guide member 42 which is arranged on a supporting leg 40 that is displaceable in the direction of the double arrow 50 essentially horizontally with respect to the supporting leg housing.

The locking mechanism 10 comprises a sleeve 12 fixed to the frame, the locking bolt 14, which is guided axially in the sleeve 12 and protrudes on the end side, a compression spring 22, which is supported between a rear inner shoulder 20 of the sleeve 12 and a collar 18 of the locking bolt 14, an actuating lever 24, which bears a link plate 26 and can be swung between two bearing plates 28 fixed to the sleeve around an eccentrically arranged shaft 27, and a driving bolt 30 which protrudes vertically in the rear part of the locking bolt, engages into the region between the two bearing plates 28 and rests there over its length against the adjacent edge section 26' of the link plate 26 and the action of the spring 22.

On the other hand, the engagement and guide member 42, which is arranged on the telescoping support leg 40 and has the shape of a ledge, includes locking surfaces 46, 48, which face away from each other, and a lead cam 44.

In order to assure sufficient lubrication, the guide sleeve 12 is provided with a lubricating nipple 36, which can be connected either to a central grease supply or be externally supplied with grease.

It will be explained in the following with reference to FIGS. 2a to d how the locking mechanism 10 and the engagement and guide member 42 cooperate in the different positions of the telescoping support leg 40. For the sake of clarity, the support leg 40 is shown in the figures in top view and the locking mechanism 10 in a side view, which is turned 90° around the axis of the sleeve relative to the support leg 40.

In FIG. 2a, the support leg 40 is in its retracted transport position, in which the locking bolt 14, which is in its locking position, rests laterally against the outer engagement surface 46 of the engagement and guide member 42. The lever 24 points in this position essentially perpendicularly downward so that the driving bolt 30 rests under the action of the spring 22 against the lateral edge 26' of the link plate 26. Before extending the supporting leg 40 in the downward direction of the arrow 50, the lever 24 is swung in counter-clockwise direction (see figures) around the shaft 27 and the locking bolt is thereby displaced via the link plate 26 and the driving bolt 30 into its unlocking position shown in FIG. 2b. In this position the lever 24 is held under the action of the spring 22 in its horizontally aligned unlocking position via the driving bolt 30 which is pressed against the cam and engagement section 26". The locking bolt 14 releases in this position the displacement path for the support leg 40 with its engagement and guide member 42 (FIG. 2b). During the displacement in the downward direction of the arrow 50, the locking bolt 14 travels with its end surface onto the lead cam 44 and is thereby displaced further into the interior of the sleeve 12. The driving bolt 30 is in this case lifted off from the cam section 26" so that finally, in the rearward release position of the locking bolt 14, the actuating lever 24 passes under the action of gravity in the direction of the arrow 52 back into its vertically downward directed first end position (FIG. 2c). Upon its further extending, the support leg 40 finally passes into the pulled-out supporting position shown in FIG. 2d in which the locking bolt 14 is displaced under the action of the spring 22 into its Locking position behind the engagement surface 48 of the engagement and guide member 42.

For retracting the supporting leg 40 out of its working position as shown in FIG. 2d, tee lever 24 must first of all again be swung into the horizontal position shown in FIG. 2b in which the locking bolt 14 comes into its unlocking position. During the further course of the displacement movement and upon reaching the position according to FIG. 2c, the lever 24 is again automatically swung into its vertically downward pointing position so that the locking bolt 14, when it reaches the position according to FIG. 2a, can again automatically pass into its locking position in front of the engagement surface 46.

The guide sleeve 12 is provided with a rearward arm 32 in which there is provided a transverse bore 34 for receiving a safety plug (not shown), which bore is blocked by the rear part of the locking bolt 14 in the unlocking position and in the release position and opened in the locking position.

In summary, the following can be stated: The present invention relates to a locking device for laterally telescoping support legs on machines. The locking device has a locking mechanism 10 fixed to the frame and an engagement and guide member 42 which cooperates with a sliding locking bolt 14 of the locking mechanism 10 and which is arranged on the pull-out supporting leg 40. The locking mechanism 10 is so designed that the locking bolt 14 automatically passes upon the displacement of the support leg 40 at the corresponding end of the displacement path into its locking position and therefore need be actuated only for the unlocking.

We claim:

1. A locking device for a support member adapted for supporting a support frame, the support member being movable relative to the support frame between a retracted transport position and an operating support position, the locking device for locking said support member at said positions comprising:

a guide sleeve connected to said support frame;

a locking bolt slidably mounted in said guide sleeve and moveable in a direction generally transverse to the direction of movement of the support member, said locking bolt being movable between a locking position, an unlocking position, and a release position; means biasing said locking bolt toward the locking position;

a driving element connected to said locking bolt;

an actuating member moveable relative to the sleeve between first and second end positions, the actuating member being engagable with said driving element such that said locking bolt is moved from the locking position to the unlocking position when the actuating member is moved from the first end position to the second end position; and an engagement and guide member fixedly connected to the support member, said engagement and guide member including a locking surface engagable with the locking bolt in its locking position for locking said support member in the transport position and another locking surface engagable with the locking bolt in its locking position for locking said support member in the operating support position, the engagement and guide member also including a cam portion between the two locking surfaces, said cam portion being engagable with the locking bolt for displacing the locking bolt from the unlocking position to the release position, wherein the actuating member becomes disengaged from the driving element when the locking bolt is in its release position and to consequently move automatically from its second end position to its first end position.

2. The locking device of claim 1 wherein said biasing means comprises a spring in said guide sleeve for biasing said locking bolt toward the locking position, and wherein the actuating member includes a link element and a lever for actuating the link element, the link element including two engagement sections with an actuating cam therebetween, said engagement sections each corresponding to a different one of said end positions of said actuating member, each said engagement section being engagable with the driving element when the actuating member is in the end position corresponding to said engagement section, said actuating member resisting movement from the end positions by force applied to the locking bolt and the driving element by the spring, and wherein the driving element is disengaged from the link element when the locking bolt is moved to its release position causing the actuating member to automatically move from its second end position to its first end position by gravitational force applied to the lever.

3. The locking device of claim 2 wherein the engagement sections of said link element are generally perpendicular to each other, and wherein said link element is rotatably mounted on a shaft connected to said sleeve for eccentric movement of said engagement sections, and wherein the lever is horizontally oriented when the actuating member is in its second end position and the lever is vertically oriented when the actuating member is in its first end position.

4. The locking device of claim 2 further comprising two bearing plates connected to the sleeve wherein the link element is mounted between the two bearing plates and the driving element comprises an arm that engages the link element between the bearing plates.

5. The locking device of claim 2 wherein the two engagement sections of the link element comprise generally straight edges and wherein the straight edges are generally perpendicular to each other.

6. The locking device of claim 1 wherein the locking bolt includes front and side surfaces and is extendable beyond the guide sleeve towards the support member, and wherein the locking surfaces of the engagement and guide member face away from each other and are oriented generally parallel to the direction of movement of the locking bolt and are engagable with the side surfaces of the locking bolt, and wherein the cam portion of the engagement and guide member is engagable with the front surface of the locking bolt.

7. The locking device of claim 1 wherein the sleeve includes a rear portion having a transverse bore extending therethrough for receiving a safety plug, wherein said bore is blocked by the locking bolt when the locking bolt is in its unlocking and release positions and said bore is accessible for receiving the safety plug when the locking bolt is in its locking position.

8. A locking device for a support member arranged on a support frame of an object and adapted for supporting the object, the support member being laterally movable relative to the support frame between a retracted transport position and an operating support position, the locking device comprising:

a guide sleeve connected to said support frame;

a locking bolt slidably mounted in said guide sleeve and moveable in a direction generally transverse to the direction of movement of the support member, said locking bolt being movable between a locking position, an unlocking position, and a release position;

a spring in said guide sleeve for biasing said locking bolt towards the locking position;

a driving element connected to said locking bolt;

an actuating member moveable relative to the sleeve between first and second end positions, the first and second end positions of the actuating member corresponding to the locking and unlocking positions, respectively, of the locking bolt, and the actuating member being engagable with said driving element such that said locking bolt is moved from the locking position to the unlocking position when the actuating member is moved from the first end position to the second end position; and an engagement and guide member fixedly connected to the support member, said engagement and guide member including a locking surface engagable with the locking bolt in its locking position for locking said support member in the transport position and another locking surface engagable with the locking bolt in its locking position for locking said support member in the operating support position, the engagement and guide member also including a lead cam portion between the two locking surfaces, said lead cam portion being engagable with the locking bolt for displacing the locking bolt from the unlocking position to the release position wherein the driving element is disengaged from the actuating member and the actuating member consequently moves automatically from its second end position to its first end position.

9. The locking device of claim 8 wherein the actuating member includes a link element and a lever for actuating the link element, the link element including two engagement sections with an actuating cam therebetween, said engagement sections each corresponding to a different one of said end positions of said actuating member, each said engagement section being engagable with the driving element when the actuating member is in the end position corresponding to said engagement section, said actuating member resisting movement from the end positions by force applied to the locking bolt and the driving element by the spring, and wherein the driving element is disengaged from the link element when the locking bolt is moved to its release position causing the actuating member to automatically move from its second end position to its first end position by gravitational force applied to the lever.

10. The locking device of claim 9 wherein the engagement sections of said link element are generally perpendicular to each other, and wherein said link element is rotatably mounted on a shaft connected to said sleeve for eccentric movement of said engagement sections, and wherein the lever is horizontally oriented when the actuating member is in its second end position and the lever is vertically oriented when the actuating member is in its first end position.

11. The locking device of claim 9 further comprising two bearing plates connected to the sleeve wherein the link element is mounted between the two bearing plates and the driving element comprises an elongated arm that engages the link element between the bearing plates.

12. The locking device of claim 9 wherein the two engagement sections of the link element comprise generally straight edges and wherein the straight edges are generally perpendicular to each other.

13. The locking device of claim 8 wherein the locking bolt includes front and side surfaces and is extendable beyond the guide sleeve towards the support member, and wherein the locking surfaces of the engagement and guide member face away from each other and are oriented generally parallel to the direction of movement of the locking bolt and are engagable with the side surfaces of the locking bolt, and wherein the lead cam portion of the engagement and guide member is engagable with the front surface of the locking bolt.

14. The locking device of claim 8 wherein the sleeve includes a rear portion having a transverse bore extending therethrough for receiving a safety plug, wherein said bore is blocked by the locking bolt when the locking bolt is in its unlocking and release positions and said bore is accessible for receiving the safety plug when the locking bolt is in its locking position.

* * * * *